US011378977B2

(12) United States Patent
Miksik et al.

(10) Patent No.: US 11,378,977 B2
(45) Date of Patent: Jul. 5, 2022

(54) ROBOTIC SYSTEMS

(71) Applicant: Emotech Ltd., London (GB)

(72) Inventors: Ondrej Miksik, London (GB); Pawel Swietojanski, London (GB); Srikanth Reddy Bethi, London (GB); Raymond W. M. Ng, London (GB)

(73) Assignee: Emotech Ltd, London (GB)

( * ) Notice: Subject to any disclaimer, the term of this patent is extended or adjusted under 35 U.S.C. 154(b) by 206 days.

(21) Appl. No.: 16/508,089

(22) Filed: Jul. 10, 2019

(65) Prior Publication Data
US 2020/0019184 A1   Jan. 16, 2020

(30) Foreign Application Priority Data
Jul. 10, 2018 (GB) ...................... 1811301

(51) Int. Cl.
*B25J 19/00* (2006.01)
*G05D 1/02* (2020.01)
(Continued)

(52) U.S. Cl.
CPC .......... *G05D 1/0276* (2013.01); *B25J 19/023* (2013.01); *B25J 19/026* (2013.01); *G05D 1/0214* (2013.01); *G06T 1/0014* (2013.01)

(58) Field of Classification Search
USPC .................................. 700/245–264
See application file for complete search history.

(56) References Cited

U.S. PATENT DOCUMENTS 6,914,622 B1 * 7/2005 Smith .................. H04N 7/15
348/E7.083
8,159,902 B2 * 4/2012 Kim .................. H04R 3/005
901/1
(Continued)

FOREIGN PATENT DOCUMENTS

CN       204442410 U       7/2015
CN       105704451 A       6/2016
(Continued)

OTHER PUBLICATIONS

Kilic et al., "Audio Assisted Robust Visual Tracking With Adaptive Particle Filtering", IEEE Transactions On Multimedia, vol. 17, No. 2, Feb. 2015, pp. 186-200.
(Continued)

*Primary Examiner* — Jonathan L Sample
(74) *Attorney, Agent, or Firm* — Eip Us LLP

(57) ABSTRACT

A robotic system is controlled. Audiovisual data representing an environment in which at least part of the robotic system is located is received via at least one camera and at least one microphone. The audiovisual data comprises a visual data component representing a visible part of the environment and an audio data component representing an audible part of the environment. A location of a sound source that emits sound that is represented in the audio data component of the audiovisual data is identified based on the audio data component of the audiovisual data. The sound source is outside the visible part of the environment and is
(Continued)

not represented in the visual data component of the audio-visual data. Operation of a controllable element located in the environment is controlled based on the identified location of the sound source.

24 Claims, 7 Drawing Sheets

(51) Int. Cl.
*B25J 19/02* (2006.01)
*G06T 1/00* (2006.01)

(56) References Cited

U.S. PATENT DOCUMENTS

| | | | | |
|---|---|---|---|---|
| 8,169,463 | B2* | 5/2012 | Enstad | H04N 5/23219 348/14.03 |
| 8,184,180 | B2* | 5/2012 | Beaucoup | H04N 21/42203 348/222.1 |
| 8,396,282 | B1* | 3/2013 | Huber | G06K 9/629 382/153 |
| 9,729,989 | B2* | 8/2017 | Marten | H04R 29/008 |
| 2006/0075422 | A1* | 4/2006 | Choi | G01S 3/7864 725/18 |
| 2008/0298571 | A1* | 12/2008 | Kurtz | G06F 3/017 348/E7.083 |
| 2009/0055019 | A1* | 2/2009 | Stiehl | B25J 9/1671 901/17 |
| 2009/0262604 | A1* | 10/2009 | Funada | G01S 5/30 367/127 |
| 2015/0032260 | A1* | 1/2015 | Yoon | G05D 1/0016 700/257 |
| 2015/0190927 | A1* | 7/2015 | Sutherland | B25J 9/1689 901/1 |
| 2015/0314454 | A1* | 11/2015 | Breazeal | B25J 11/001 700/259 |
| 2017/0278519 | A1* | 9/2017 | Visser | G01S 3/803 |
| 2019/0077019 | A1* | 3/2019 | Hickman | G06N 20/00 |
| 2019/0212441 | A1* | 7/2019 | Casner | G05D 1/0255 |

FOREIGN PATENT DOCUMENTS

| | | | |
|---|---|---|---|
| CN | 207281488 U | 4/2018 | |
| EP | 2637073 A2 | 9/2013 | |
| EP | 3739415 A1 * | 11/2020 | A63H 13/02 |

OTHER PUBLICATIONS

Silva et al., "Audiovisual Sensing of Human Movements for Home-Care and Security In A Smart Environment", International Journal on Smart Sensing and Intelligent Systems, vol. 1, No. 1, Mar. 2008 pp. 220-245.

Arnab et al., "Joint Object-Material Category Segmentation from Audio-Visual Cues", Department of Engineering Science, University of Oxford, Oxford, UK 2015 (http://www.robots.ox.ac.uk/~aarnab/projects/bmvc_2015/Arnab_BMVC_2015.pdf).

http://www.irobot.com/For-the-Home/Vacuuming/Roomba.aspx.

http://www.willowgarage.com/robot/overview.

Qian et al., "3D Audio-Visual Speaker Tracking With an Adaptive Particle Filter", Centre for Intelligent Sensing, Queen Mary University of London, UK, ICT-irst, Fondazione Bruno Kessler, Trento, Italy (https://www.eecs.qmul.ac.uk/~andrea/papers/2017_ICASSP_3DAVTrackingAdaptiveParticleFilter_Qian_Brutti_Omologo_Cavallaro.pdf).

Owens et al., "Visually Indicated Sounds"; MIT / U.C. Berkeley / Google Research, Apr. 30, 2016 (https://arxiv.org/pdf/1512.08512.pdf).

Owens et al., "Ambient Sound Provides Supervision for Visual Learning", Massachusetts Institute of Technology / Google Research, Dec. 5, 2016 (https://arxiv.org/pdf/1608.07017.pdf).

Zhang et al., "Shape and Material from Sound", 31st Conference on Neural Information Processing Systems (NIPS 2017), Long Beach, CA, USA (http://papers.nips.cc/paper/6727-shape-and-material-from-sound.pdf).

United Kingdom Search report dated Nov. 9, 2018 for United Kingdom Application No. GB 1811301.9.

* cited by examiner

ROBOTIC SYSTEMS

CROSS-REFERENCE TO RELATED APPLICATIONS

This application claims priority to UK Application No. 1811301.9, filed Jul. 10, 2018, under 35 U.S.C. § 119(a). The above-referenced patent application is incorporated by reference in its entirety.

BACKGROUND OF THE INVENTION

Field of the Invention

The present disclosure relates to robotic systems. More particularly, but not exclusively, the present disclosure relates to robotic systems, methods of controlling robotic systems, and computer programs arranged to control robotic systems.

Description of the Related Technology

Robotic systems can be provided with computer vision functionality to enable the robotic system to visually detect objects, for example people, in the surrounding environment. Such robotic systems may, for example, be used to recognise a particular person in the surrounding environment.

SUMMARY

According to a first aspect of the present invention, there is provided a method of controlling a robotic system, the method comprising:

receiving, via at least one camera and at least one microphone, audiovisual data representing an environment in which at least part of the robotic system is located, the audiovisual data comprising a visual data component representing a visible part of the environment and an audio data component representing an audible part of the environment;

identifying, based on the audio data component of the audiovisual data, a location of a sound source that emits sound that is represented in the audio data component of the audiovisual data, wherein the sound source is outside the visible part of the environment and is not represented in the visual data component of the audiovisual data; and controlling operation of a controllable element located in the environment based on the identified location of the sound source.

According to a second aspect of the present invention, there is provided a robotic system comprising a controller configured to perform a method of controlling a robotic system, the method comprising:

receiving, via at least one camera and at least one microphone, audiovisual data representing an environment in which at least part of the robotic system is located, the audiovisual data comprising a visual data component representing a visible part of the environment and an audio data component representing an audible part of the environment;

identifying, based on the audio data component of the audiovisual data, a location of a sound source that emits sound that is represented in the audio data component of the audiovisual data, wherein the sound source is outside the visible part of the environment and is not represented in the visual data component of the audiovisual data; and controlling operation of a controllable element located in the environment based on the identified location of the sound source.

According to a third aspect of the present invention, there is provided a computer program arranged to perform a method of controlling a robotic system, the method comprising:

receiving, via at least one camera and at least one microphone, audiovisual data representing an environment in which at least part of the robotic system is located, the audiovisual data comprising a visual data component representing a visible part of the environment and an audio data component representing an audible part of the environment;

identifying, based on the audio data component of the audiovisual data, a location of a sound source that emits sound that is represented in the audio data component of the audiovisual data, wherein the sound source is outside the visible part of the environment and is not represented in the visual data component of the audiovisual data; and controlling operation of a controllable element located in the environment based on the identified location of the sound source.

Further features and advantages will become apparent from the following description, given by way of example only, which is made with reference to the accompanying drawings.

DETAILED DESCRIPTION OF CERTAIN INVENTIVE EMBODIMENTS

Figure 1:
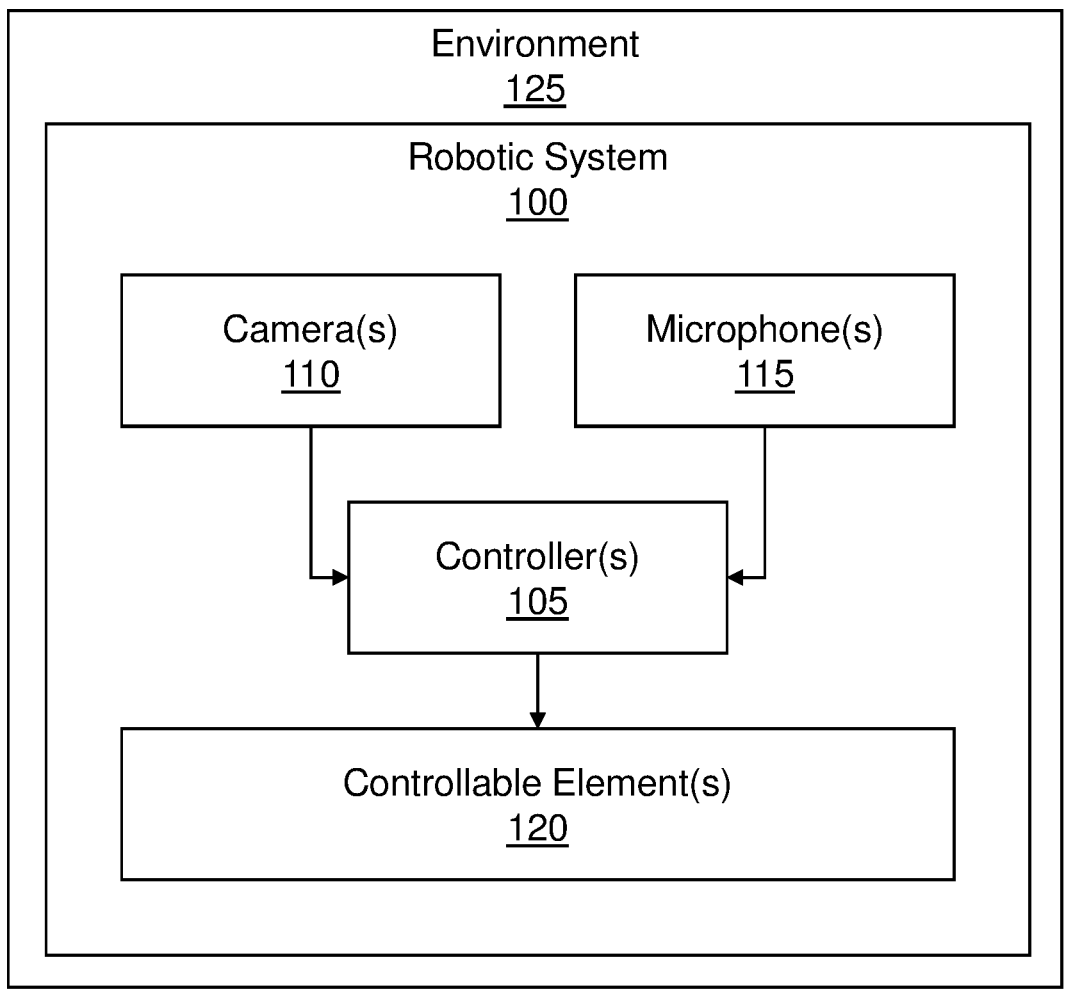
FIG. 1 shows a schematic block diagram of an example of a robotic system in accordance with embodiments, the robotic system being in an environment.

Referring to FIG. 1, there is shown schematically an example of a robotic system 100. A "robotic system" may be considered to be a guided agent. The robotic system 100 may be guided by one or more computer programs and/or electronic circuitry. The robotic system 100 may be guided by an external control device or the control may be embedded within the robotic system. The robotic system 100 may comprise one or more hardware components, implemented on one or more hardware devices. In some such examples, the components of the robotic system 100 are comprised in a single housing. In other such examples, the components of the robotic system 100 are comprised a plurality of housings. The plurality of housings may be distributed. The plurality of housings may be coupled by wired and/or wireless connections. The robotic system 100 may comprise one or more software components including, but not limited to, cloud- or network-based software components. The robotic system 100 may be configured to interact with human and/or non-human entities. The robotic system 100 may be considered to be an interactive device. The robotic system 100 may or may not be configured to move. In some examples, the robotic system 100 is a smart device. An example of a smart device is a smart home device, otherwise referred to as a home automation device. A smart home device may be arranged to control environmental parameters of a building. Examples of environmental parameters include, but are not limited to, lighting, heating, ventilation, telecommunications systems and entertainment systems. The robotic system 100 described herein may be arranged to have some or all of the functionality of such a smart home device. The robotic system 100 may comprise an autonomous robot. An autonomous robot may be considered to be a robot that performs functions with a relatively high degree of autonomy or independence compared to a non-autonomous robot.

In this example, the robotic system 100 comprises a controller 105, a camera 110, a microphone 115 and a controllable element 120. The controllable element 120 is any element that can be controlled by the controller 105. The controllable element 120 may take various different forms. For example, the controllable element 120 may be in the form of a component of an electronic device. An example of such a component is a processor. The controllable element 120 could, however, be a collection of components of an electronic device, an electronic device itself, a collection of electronic devices, a system etc. The robotic system 100 can comprise more than one controller 105 (which may comprise one or more different types of controller), more than one camera 110 (which may comprise one or more different types of camera), more than one microphone 115 (which may comprise one or more different types of microphone) and/or more than one controllable element 120 (which may comprise one or more different types of controllable element). The robotic system 100 is, in some examples, equipped with one or multiple cameras 110 and a microphone array comprising a plurality of microphones 115.

The robotic system 100 may be considered to be a multimodal robotic system in that the robotic system 100 has multimodal input functionality. In particular, the input to the robotic system 100 has both a visual modality (via the camera 110) and an audio modality (via the microphone 115). The robotic system 100 could have one or more further modalities.

At least part of the robotic system 100 is located in an environment (also referred to as a "surrounding environment" or "surroundings") 125. The environment 125 may correspond to a building, for example. Examples of buildings in which the robotic system 100 may be at least partly located include, but are not limited to, homes, offices, hotels, supermarkets etc. In some examples, the robotic system 100 is fully located within the environment 125. For example, the controller 105, the camera 110, the microphone 115 and the controllable element 120 could all be located within a home environment. In other examples, the robotic system 100 is only partially located within the environment 125. For example, the camera 110, the microphone 115 and the controllable element 120 could all be located within a home environment and the controller 105 could be located in another environment, for example remote from the home environment in which the camera 110, the microphone 115 and the controllable element 120 are located.

The controller 105 receives audiovisual data representing the environment 125. The controller 105 receives the audiovisual data via the camera 110 and the microphone 115. The audiovisual data comprises a visual data component and an audio data component. In some examples, the controller 105 receives the visual data component at the same time as receiving the audio data component. However, the controller 105 may receive the visual data component and audio data component separately in other examples. The controller 105 may receive the audiovisual data from the camera 110 and the microphone 115 directly and/or via one or more intermediate elements (not shown). The one or more intermediate elements may, for example, receive the visual data component from the camera 110 and the audio data component from the microphone 115, multiplex the visual and audio data components together, and provide the multiplexed audiovisual data to the controller 105.

The visual data component represents a visible part of the environment 125. The visible part of the environment 125 may correspond to the field of view of the camera 110. The visible part of the environment 125 may correspond to the part of the environment 125 in which objects can be visually detected by the camera 110. As such, objects located within the visible part of the environment 125 can be visually detected by the camera 110 and objects located outside the visible part of the environment 125 cannot be visually detected by the camera 110.

The audio data component represents an audible part of the environment 125. The audible part of the environment 125 may correspond to the part of the environment 125 from which emitted sounds can be audibly detected by the microphone 115. As such, sound emitted from a sound source located within the audible part of the environment 125 can be audibly detected by the camera 110 and sound emitted from a sound source located outside the audible part of the environment 125 cannot be audibly detected by the camera 110.

The visible and audible parts of the environment 125 may, but do not necessarily, have a degree of overlap. In some examples, the visible part of the environment 125 is completely contained within the audible part of the environment 125. In such examples, sound from objects that are in the visible part of the environment 125 can be detected by the microphone 115. In some examples, at least part of the audible part of the environment 125 is not also in the visible part of the environment 125. In such examples, sound from objects that are not in the visible part of the environment 125 can nevertheless be detected by the microphone 115.

In accordance with examples described herein, audible activity takes place in the environment 125. The audible activity may also be accompanied by corresponding visible activity. The audible activity is audible from the perspective of the robotic system 100. In other words, the robotic system 100 can audibly detect the audible activity. The audible activity involves emission of sound by a sound source. If the sound source is located within the visible part (but not also the audible part) of the environment 125, then the robotic system 100 can visually (but not audibly) detect the sound source. If the sound source is located within the visible and audible parts of the environment 125 (for example if the visible and audible parts of the environment 125 coincide), then the robotic system 100 can visually and audibly detect the sound source. If the sound source is located within the audible part (but not also the visible part) of the environment 125, then the robotic system 100 can audibly (but not visually) detect the sound source.

Examples that will now be described relate to activity that involves emission of sound by a sound source that is outside the visible part of the environment 125 and is not represented in the visual data component of the audiovisual data. However, in accordance with examples described herein, the controller 105 can nevertheless identify at least one attribute of the audible activity taking place in the audible part of the environment 125 based on the audio data component of the audiovisual data. As such, even though the robotic system 100 cannot visually detect (in other words "see") the audible activity, the robotic system 100 can still audibly detect (in other words "hear") the audible activity.

In some examples, the audible activity is caused by activity of a person located in the environment 125. The person may be located in the audible part of the environment 125, outside of the visible part of the environment 125. Examples of such audible activity include, but are not limited to, speaking, walking, opening a door, closing a door etc. In some such examples, the person that causes the audible activity is the sound source that emits the sound whereas in other such examples, an object other than the person that causes the audible activity is the sound source. As such, the person located in the environment 125 may cause the audible activity directly (where the person is the sound source) or indirectly (where the person is not the sound source). In some examples, the activity of the person is natural activity that it is not specifically intended to invoke and/or be used in accordance with the measures described herein. For example, the person could be speaking naturally with another person by telephone, walking naturally between rooms of their house, and still make use of the measures provided herein. In other examples, the activity of the person is specifically intended to invoke and/or be used in accordance with the measures described herein. For example, the person could make a predetermined sound to cause a specific operation to be performed. As such, in some examples, the robotic system 100 is proactive in terms of controlling the controllable element 120. In some examples, the robotic system 100 can control the controllable element 120 without having to receive a specific command to do so. For example, the robotic system 100 may hear that an electronic fan has been turned on in a room that is outside the visible part of the environment 125 and may reduce the temperature in the room in question, without a user having specifically commanded the robotic system 100 to reduce the temperature in that room. As such, in some examples, the controlling of the controllable element 120 is not based on an audible command issued by a user of the robotic system 100.

In some such examples, in which the audible activity is caused by activity of a person located in the environment 125, the identified at least one attribute comprises an identity of the person. As such, the robotic system 100 can identify who caused the sound to be emitted from the sound source. For example, where the audible activity corresponds to a person speaking, the robotic system 100 may recognise the voice of the speaker and thereby identify the person who is speaking. Such recognition may be performed using a trained artificial neural network, for example. However, such recognition could be performed in other ways. As such, even if the person is outside the visible part of the environment 125 and is not visible to the robotic system 100, the person may nevertheless still be identified. The robotic system 100 can learn an audio, visual and/or audiovisual representation of users so that robotic system 100 is able to recognise them later on. This can provide an approach with a relatively low risk of errors. As such, audiovisual user recognition functionality may be provided. In some examples, the robotic system 100 is not limited to tracking generic objects, but can be instance-specific. For example, the robotic system 100 can learn both the vocal and visual appearance of a user and can then recognise the user vocally and/or visually.

In some examples, the audible activity is independent of any activity of a person located in the environment 125 when the sound is emitted. Such examples differ from so called "user-in-the-loop" scenarios which may rely on human activity to operate. An example of such activity is a clock that chimes every hour, without specific human activity each time the clock chimes.

In some examples, the identified at least one attribute comprises an activity type of the audible activity. As such, the robotic system 100 can identify what type of activity and/or sound source caused the sound to be emitted from the sound source. For example, where the audible activity corresponds to door being closed, the robotic system 100 may recognise the sound emitted in association with the audible activity as being a closing door and may recognise the sound source as being a door. Such recognition may be performed using a trained artificial neural network, for example. However, such recognition could be performed in other ways. As such, even if the activity is outside the visible part of the environment 125 and is not visible to the robotic system 100, the type of the activity may nevertheless still be identified.

In some examples, the identified at least one attribute of the audible activity comprises a location of the sound source. As such, the controller 105 can identify where the sound source is located. The robotic system 100 can, for example, learn how to infer where a person or other object might be if they are not visible in the visual data component of the received audiovisual data. This could happen, for example, as a result of the limited field of view of the camera 110 and/or occlusions. The accuracy of the location of the sound source may vary in different scenarios. For example, in some scenarios, the location of the sound source may correspond to a particular room in which the sound source is located. In other scenarios, a more precise location may be used, for example to pinpoint a more accurate location of the sound source on a map.

In some examples, the location of the sound source is identified based on the activity type of the audible activity. For example, where the environment 125 is a building having a single door and where the audible activity corresponds to a door being closed, the robotic system 100 can determine that the location of the sound source corresponds to the location of the door. Where the location of the door is known to the robotic system 100, the location of the sound source can thereby be determined.

In some examples, identifying the location of the sound source comprises using a spatial model of the environment 125. The spatial model could, for example, identify the location of the door referred to above. In some examples, the spatial model of the environment 125 represents part of the environment 125 that is outside the field of view (also known as "frustum") of the camera 110. The spatial model of the environment 125 may represent at least part of the visible part of the environment 125. The spatial model may represent least part of the audible part of the environment 125 that is not also part of the visible part of the environment 125. The spatial model can, in such examples, enable the robotic system 100 to have a spatial understanding of parts of the environment 125 that are not visible to the robotic system 100. The spatial model can take various different forms. For example, the spatial model could correspond to a 3D map of the environment 125, a floorplan of the environment 125 etc.

In some examples, the controller 105 generates the spatial model using data received via the camera 110 and/or via the microphone 115. Such data may have been received before the audiovisual data is received. For example, such data may have been received as part of a spatial awareness phase in which the robotic system 100 becomes aware of the environment 125. The robotic system 100 could, for example, have been moved around the environment 125 to build such spatial awareness. In some examples, the robotic system 100 obtains the spatial model by causing movement of at least part of the robotic system 100 such that different representations of different regions of the environment 125 are captured. For example, a part of the robotic system 100 comprising the camera 110 may move from an initial position to one or more further positions to enable the camera 110 to capture visual data of different regions of the environment 125. Such movement may comprise rotation of the at least part of the robotic system 100 that comprises the camera 110. For example, the at least part of the robotic system 100 that comprises the camera 110 may rotate 360 degrees around a vertical axis. Images of the environment 125 from the different perspectives may be stitched together digitally to form a 360 degree spatial model of the environment 125. As such, a 360 degree spatial model of the environment 125 may, in some cases, be obtained without multiple cameras 110 positioned at different locations throughout the environment 125 being used. In other examples, multiple cameras 110 in different locations in the environment 125 could be used. As such the robotic system 100 can build a spatial model of the environment 125. The robotic system 100 may build the spatial map in a calibrating state, after calibration or at another time. The robotic system 100 may build the spatial model at an initial stage and update the spatial model at one or more subsequent stages. The spatial model may correspond to an audiovisual "map" of the environment 125. The spatial model may be used to improve 2D/3D pose estimation in relation to users. In some examples, the controller 105 obtains, or is provided with, the spatial model in another way, in addition to or as an alternative to generating the spatial model itself. For example, the spatial model may be stored in the robotic system 100 at the point of manufacture and/or during a calibration stage, the robotic system 100 may download (or otherwise receive) the spatial model from a spatial model repository when the robotic system 100 is first powered on in the environment 125, a user of the robotic system 100 may provide at least some of the spatial model to the robotic system 100 etc.

In some examples, the robotic system 100 comprises an array of microphones 115 comprising at least first and second microphones 115. The sound emitted by the sound source may be received at both the first and second microphones 115. The location of the sound source can be identified based on differences in phase and/or intensity of the sound as received at the first and second microphones 115. In some examples, identifying the location of the sound source comprises determining a direction of the sound source with respect to the microphone 115. The direction of the sound source with respect to the microphone 115 may be identified, for example, by comparing the phase difference between the sound as received at the first and second microphones 115. In some examples, identifying the location of the sound source comprises determining a distance of the sound source with respect to the microphone 115. The distance of the sound source with respect to the microphone 115 may be identified, for example, by comparing the phase difference between the sound as received at the first and second microphones 115 and/or by comparing the intensity different between the sound as received at the first and second microphones 115.

Some examples comprise determining a location of at least part of the robotic system 100 using the location of the sound source as a reference location. As such, the robotic system 100 may be able to self-locate by determining the location of the sound source and a relationship between the location of the sound source and the location of the robotic system 100. For example, the robotic system 100 may be located in a building having a single door. The robotic system 100 may recognise that the door has been closed and may be able to determine the location of the door using a spatial model of the building, even though the door is not within the visible part of the environment 125. The robotic system 100 may also be able to determine a distance and direction of the door relative to the robotic system 100. Using the spatial model of the building and the determined distance and direction of the robotic system 100 with respect to the door, the robotic system 100 may be able to identify its own location within the special model and, for example, determine in which room of the building it is located. The robotic system 100 may determine one or more aspects of its own pose in order to self-locate. For example, the robotic system 100 may determine its orientation and/or rotation, for example with respect to an origin. For example, the robotic system 100 may determine that the camera 110 is facing in a particular direction and use this in combination with the determined direction of the sound source, relative to the robotic system 100, to identify the location of the sound source.

In some examples, the sound source may be a specially configured beacon that broadcasts sound so that systems such as the robotic system 100 can self-locate. Whether in this context or otherwise, the sound emitted by the sound source may be inaudible to the human ear. For example, the frequency of the emitted sound may be selected to be outside the human hearing range. As such, the sound source may enable the robotic system 100 to self-locate without being disruptive to nearby people.

Some examples comprise analysing the visual data component of the audiovisual data for visible activity corresponding to the audible activity. This may be performed even though the visible activity is, in fact, not represented in the visual data component of the audiovisual data. In particular, the robotic system 100 may detect the audible activity based on the audio component of the audiovisual data and may then analyse the visual data component of the audiovisual data for corresponding visible activity. In this specific example, the robotic system 100 would not be able to identify corresponding visible activity in the visual data component of the audiovisual data since the audible activity is outside the field of view of the camera 110 and would therefore not be represented in the visual data component of the audiovisual data.

Some examples comprise, in response to determining that the audible activity is outside an initial field of view of the camera 110, causing the camera 110 to be configured to have a further, different field of view. For example, the camera 110 may initially be pointing in a given direction in the environment 125. The robotic system 100 may detect the audible activity based on the audio data component of the audiovisual data and may search for corresponding visible activity in the visual data component of the audiovisual data.

In response to not identifying any such corresponding visible activity, the robotic system 100 may cause the camera 110 to point in another direction, such that the camera 110 has the further field of view. The audible activity may or may not be within the further field of view. The robotic system 100 may cause the camera 110 to be configured to have the further field of view based on the identified location of the audible activity. For example, the robotic system 100 may be configured to cause the camera 110 to point towards the audible activity where the camera 110 was not initially configured in that way. Alternatively or additionally, the robotic system 100 may cause the camera 110 to be configured to have the further field of view to search for visible activity corresponds to the audible activity. For example, the audible activity may correspond to a door closing and the robotic system 100 may be configured to cause the camera 110 to have the further field of view to try to capture visible data representing the door, whether closed or being closed.

The controller 105 controls operation of the controllable element 120 based on the identified at least one attribute of the audible activity. Such control may comprise instructing the controllable element 120 to operate in a particular way and/or requesting the controllable element 120 to operate in a particular way. The particular way in which operation of the controllable element 120 is controlled can depend on various factors, for example the nature of the controllable element 120. Where, for example, the controllable element 120 comprises or is comprised in a smart light switch, controlling the controllable element 120 may comprise causing a light to be on, off, dimmed etc.

In this specific example, the controllable element 120 is comprised in the robotic system 100. In other examples, the controllable element 120 is located in the environment 125 in which the robotic system 100 is located but is not comprised in the robotic system 100 itself.

In some examples, the controllable element 120 is configured to control at least one environmental parameter of the environment 125. Examples of environmental parameters include, but are not limited to, temperature and lighting levels.

In some examples, the controllable element 120 is comprised in a self-propelling device. Some or all of the other elements of the robotic system 100 may also be comprised in the self-propelling device, along with the controllable element 120. A self-propelling device is a device whose movement is driven by an energy source of the self-propelling device. Examples of self-propelling devices include, but are not limited to, smart vacuum cleaners, smart lawnmower, a robotic assistive device, a robotic pet, certain types of vehicle etc. Controlling the operation of the controllable element 120 may, in some such examples, comprise causing the self-propelling device to avoid the location of the sound source. Controlling the operation of the controllable element 120 may, in some such examples, comprise causing the self-propelling device to move towards the location of the sound source.

In other examples, the controllable element 120 is comprised in a mobile, but not self-propelling, device. Examples of mobile, but not self-propelling devices include, but are not limited to, appliances, certain types of vehicle, and certain types of smart home controllers.

In other examples, the controllable element 120 is comprised in a non-mobile device (also referred to as "static" or "fixed"). Certain types of smart home controllers, for example wall-mounted thermostats, are examples of non-mobile devices.

In some examples, controlling the operation of the controllable element 120 comprises transmitting a control signal to the controllable element 120. Such transmission may be wireless or wireline. As such the controller 105 can readily control the controllable element 120.

As such, in accordance with some examples described herein, the robotic system 100 comprises a controller 105 configured to identify a location of out-of-view audible activity using audio data received via an array of microphones 115 and to transmit a control signal to control operation of the controllable element 120 in dependence on the identified location of the out-of-view audible activity.

Further, in accordance with some examples described herein, the robotic system 100 is configured to use a microphone array 115 to identify a location of activity that is audible by and not visible to the robotic system 100.

In some examples, the camera 110, the microphone 115 and the controllable element 120 are all comprised in the same electronic device as each other. However, in other examples the camera 110, the microphone 115 and/or the controllable element 120 are distributed across at least two different electronic devices. The different electronic devices may be of the same or different electronic device types.

In FIG. 1, the camera 110, microphone 115 and controllable element 120 are all shown to be communicatively coupled with the controller 105. The communicative couplings may be wired, wireless or otherwise. By way of a specific example, the robotic system 100 may be distributed around a building such that the camera 110, microphone 115 and controllable element 120 are all wirelessly communicatively coupled to the controller 105.

Although various elements are depicted in FIG. 1, the robotic system 100 could comprise more, fewer or different elements in other examples. For example, although only one camera 110 is depicted in FIG. 1, the robotic system 100 could include a plurality of cameras 110, for example to provide stereoscopic imaging, to provide a larger overall visible field of view etc. Furthermore, although only one microphone 115 is depicted in FIG. 1, the robotic system 100 could include a plurality of microphones 115, for example to facilitate identifying the location of the sound source, to provide a larger overall audible field of view etc. Furthermore, although only controllable element 120 is depicted in FIG. 1, the robotic system 100 could include a plurality of controllable elements 120, for example to facilitate coordinating controlling of multiple devices comprising respective controllable elements 120, to facilitate coordinating controlling of multiple controllable elements 120 comprised in a single device etc.

Figure 2:
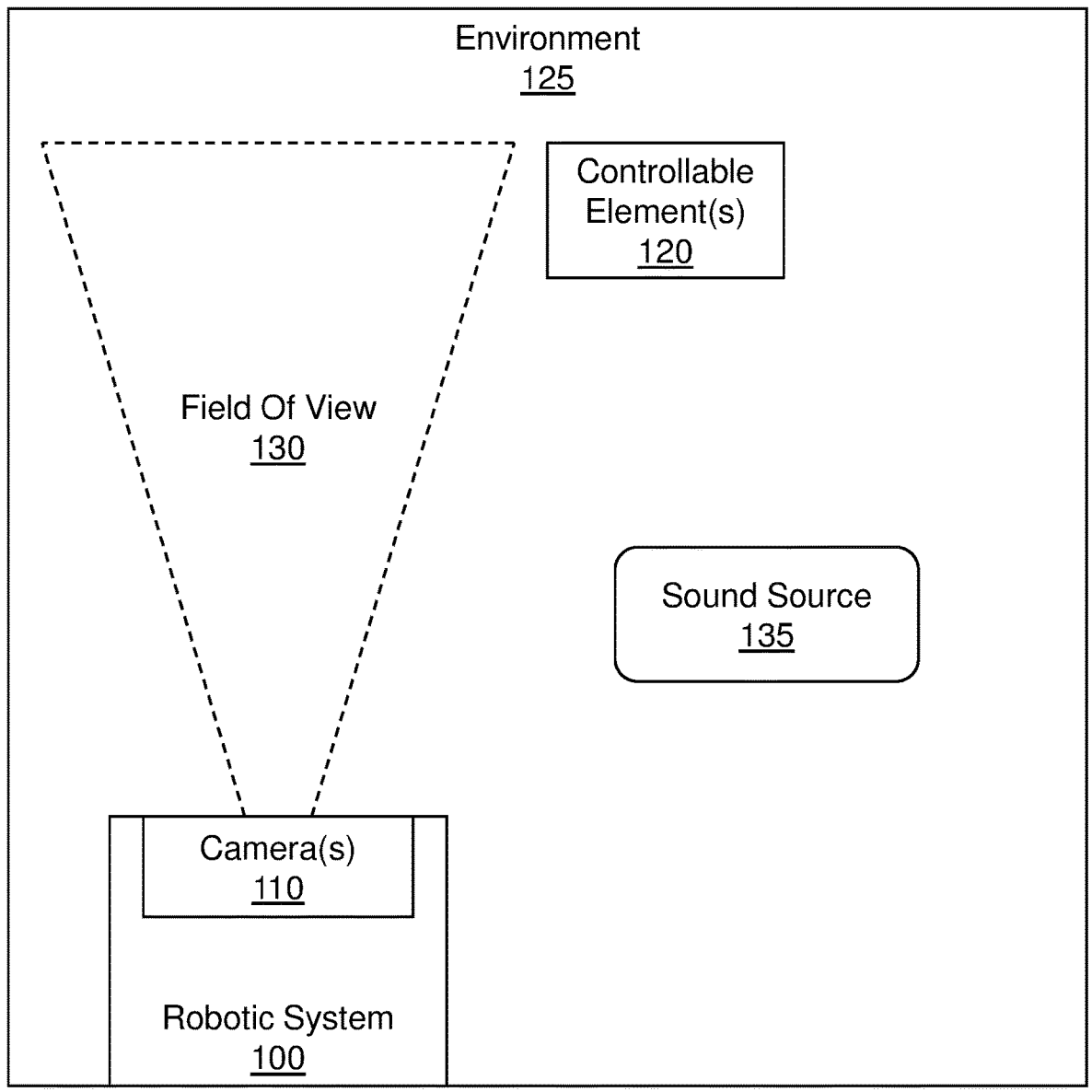
FIG. 2 shows a schematic block diagram of an example of an environment comprising a robotic system in accordance with embodiments.

Referring to FIG. 2, there is shown schematically an example of an environment 125 comprising the robotic system 100. The environment 125 may correspond to a room in a building, for example. In this specific example, the robotic system 100 (more specifically the camera 110 of the robotic system 100) has a field of view 130. A sound source 135 is located outside the field of view 130 but is within the audible field of view (which may be assumed to be the entire room in this example). In accordance with examples described herein, the robotic system 100 can nevertheless still control operation of the controllable element 120 in relation to audible activity associated with the sound source 135.

Figure 3:
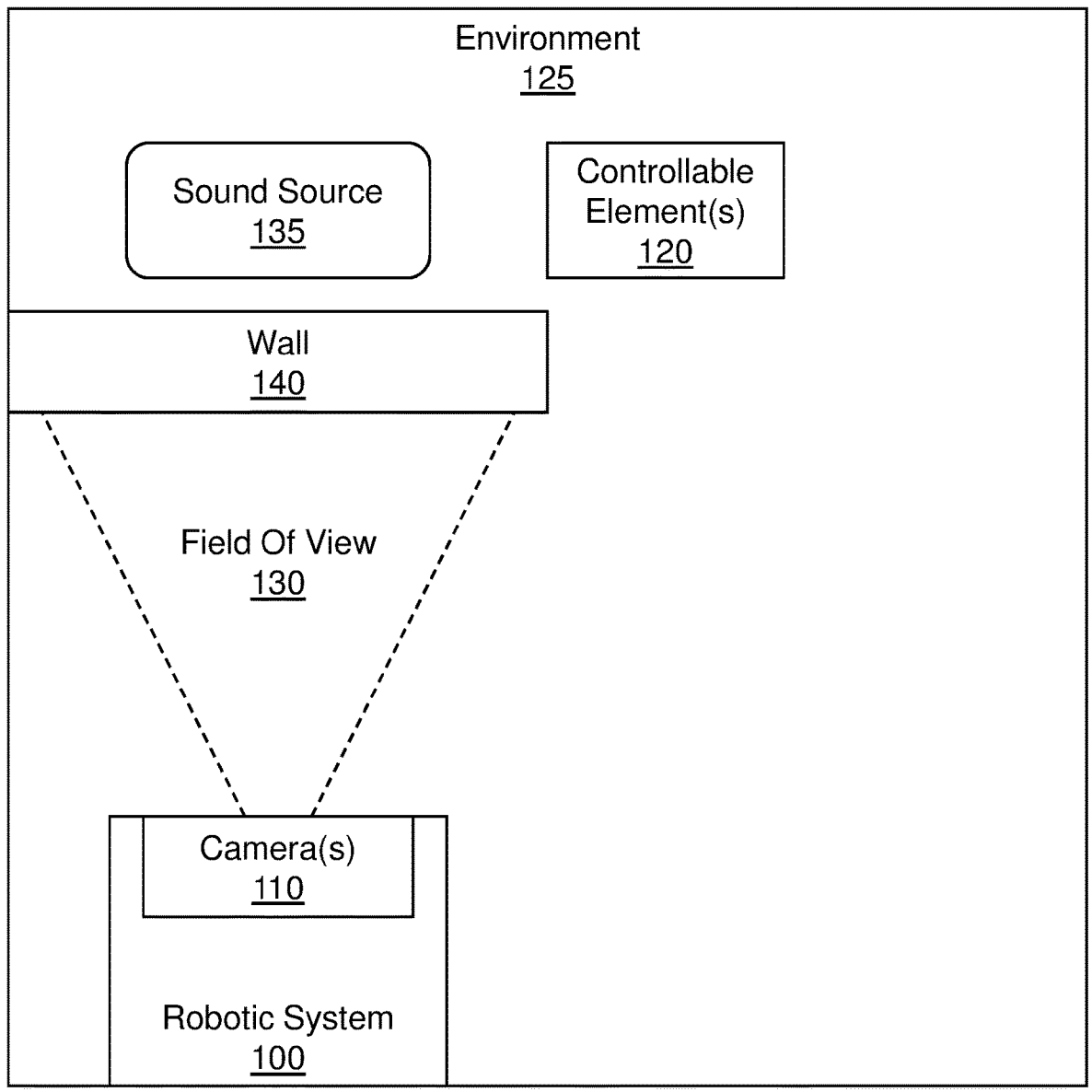
FIG. 3 shows a schematic block diagram of another example of an environment comprising a robotic system in accordance with embodiments.

Referring to FIG. 3, there is shown schematically an example of another environment 125 comprising the robotic system 100. The environment 125 depicted in FIG. 3 is similar to the environment 125 depicted in FIG. 2 and may also correspond, for example, to a room in a building.

However, the environment 125 depicted in FIG. 3 comprises a wall 140 between the robotic system 100 and the sound source 135. Although, in this example, the camera 110 of the robotic system 100 is pointing towards the sound source 135, the wall 140 occludes the sound source 135 such that visual data captured by the camera 110 would not comprise a visual representation of the sound source 135. In accordance with examples described herein, the robotic system 100 can nevertheless still control operation of the controllable element 120 in relation to audible activity associated with the sound source 135.

Referring to FIG. 3, there is shown schematically an example of another environment 125 comprising the robotic system 100. The controller 105, the camera 110, the microphone 115 and the controllable element 120 are distributed across multiple different devices. Each is located in a different part of the environment 125. The camera 110, the microphone 115 and the controllable element 120 may have respective and/or shared communicative couplings to the controller 105. The communicative couplings may be wired or wireline, for example. A distributed deployment may provide a degree of optimisation compared to a more unified deployment.

Figure 4:
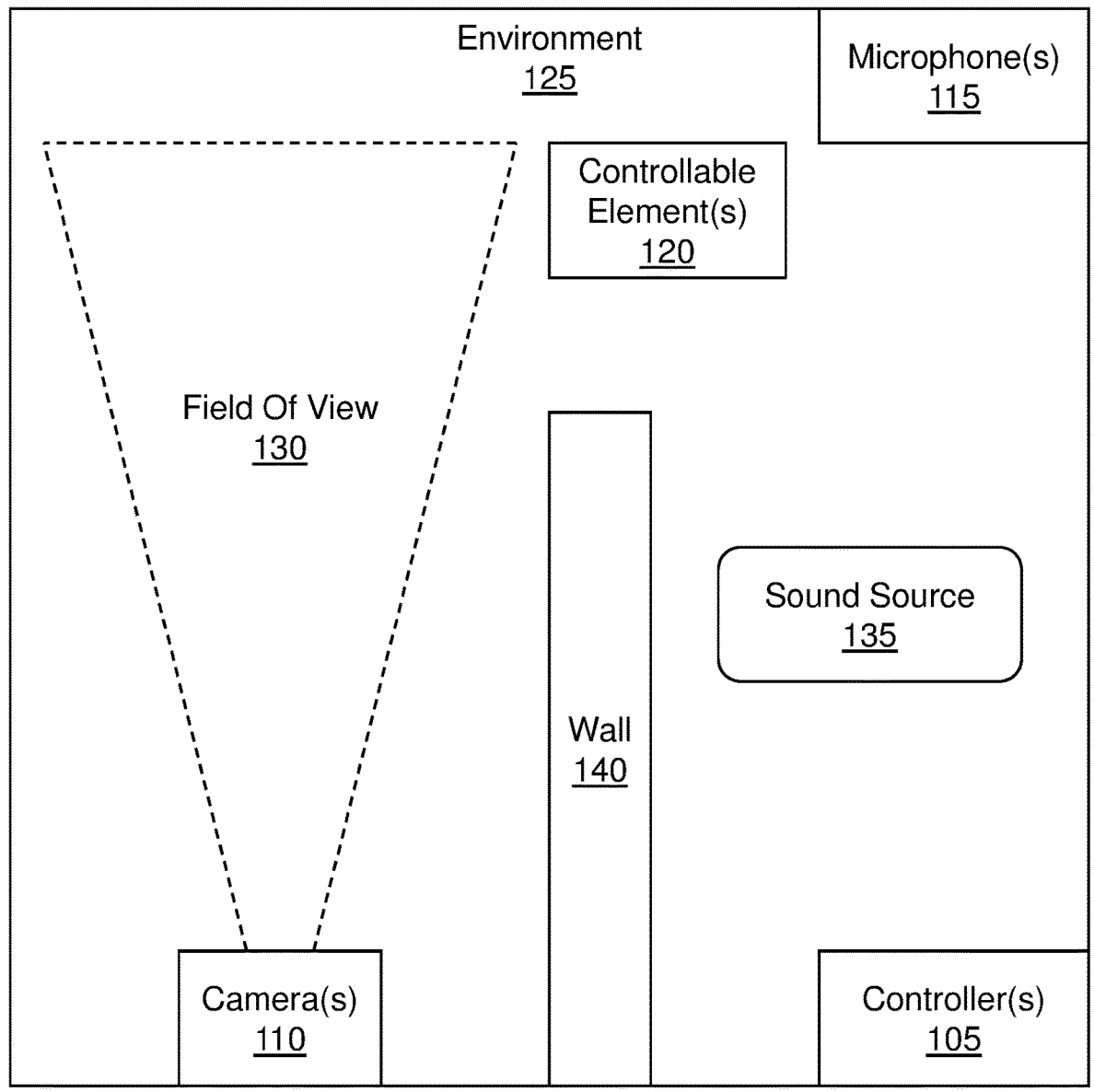
FIG. 4 shows a schematic block diagram of another example of an environment comprising a robotic system in accordance with embodiments.

Referring to FIG. 4, there is shown schematically an example of another environment 125 comprising the robotic system 100. In this example, the robotic system 100 is highly distributed, with each of the controller 105, the camera 110, the microphone 115 and the controllable element 120 being in different respective electronic devices.

Figure 5:
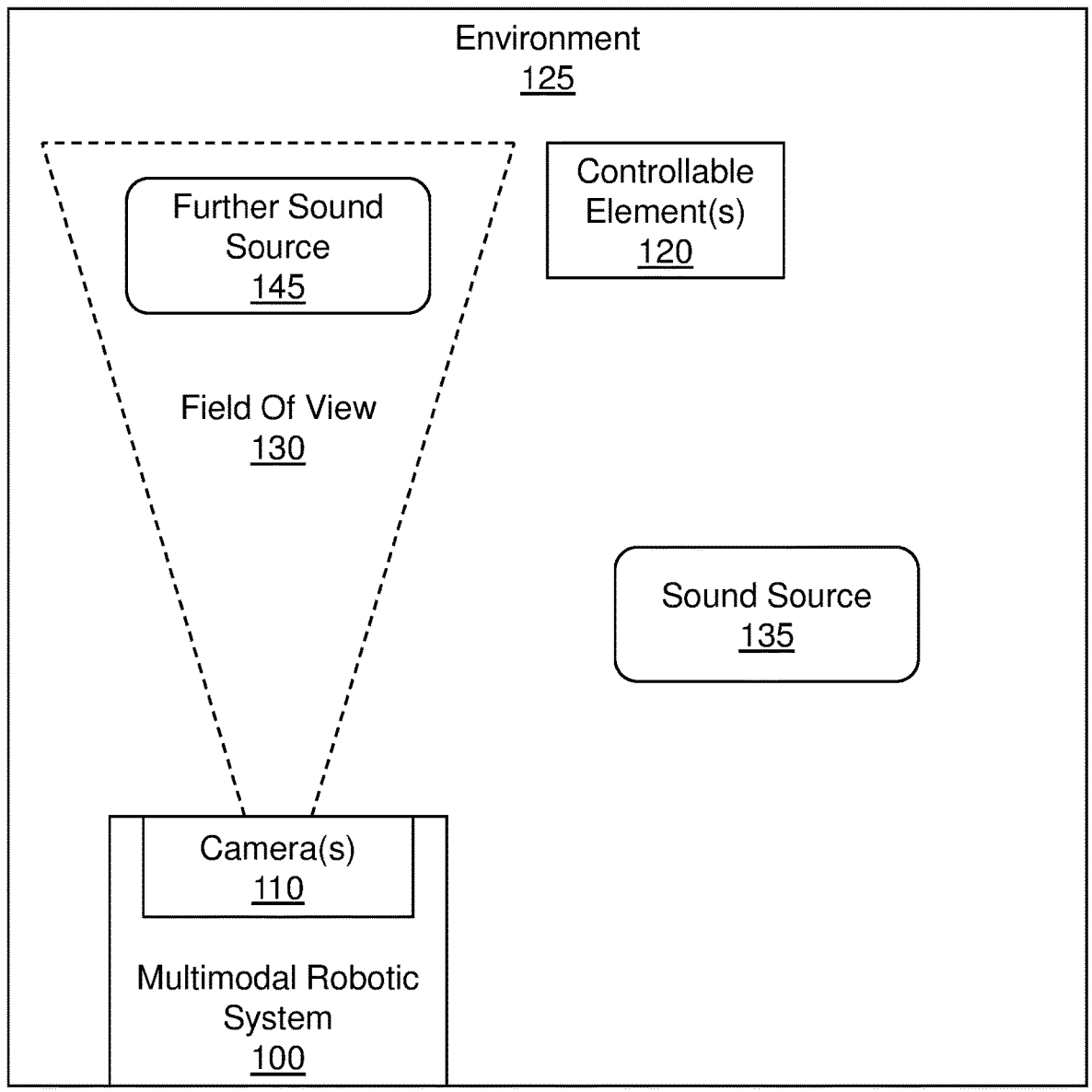
FIG. 5 shows a schematic block diagram of another example of an environment comprising a robotic system in accordance with embodiments.

Referring to FIG. 5, there is shown schematically an example of another environment 125 comprising the robotic system 100. In this example, a further sound source 145 is within the visible part of the environment 125. In particular, the further sound source 145 is within the field of view 130 of the camera 110 and is represented in the visual data component of the audiovisual data. In some examples, further activity involving emission of sound by the further sound source 145 occurs. In some examples, at least one attribute of the further activity is identified. Examples of such attribute include, but are not limited to, location, identity and type.

Figure 6:
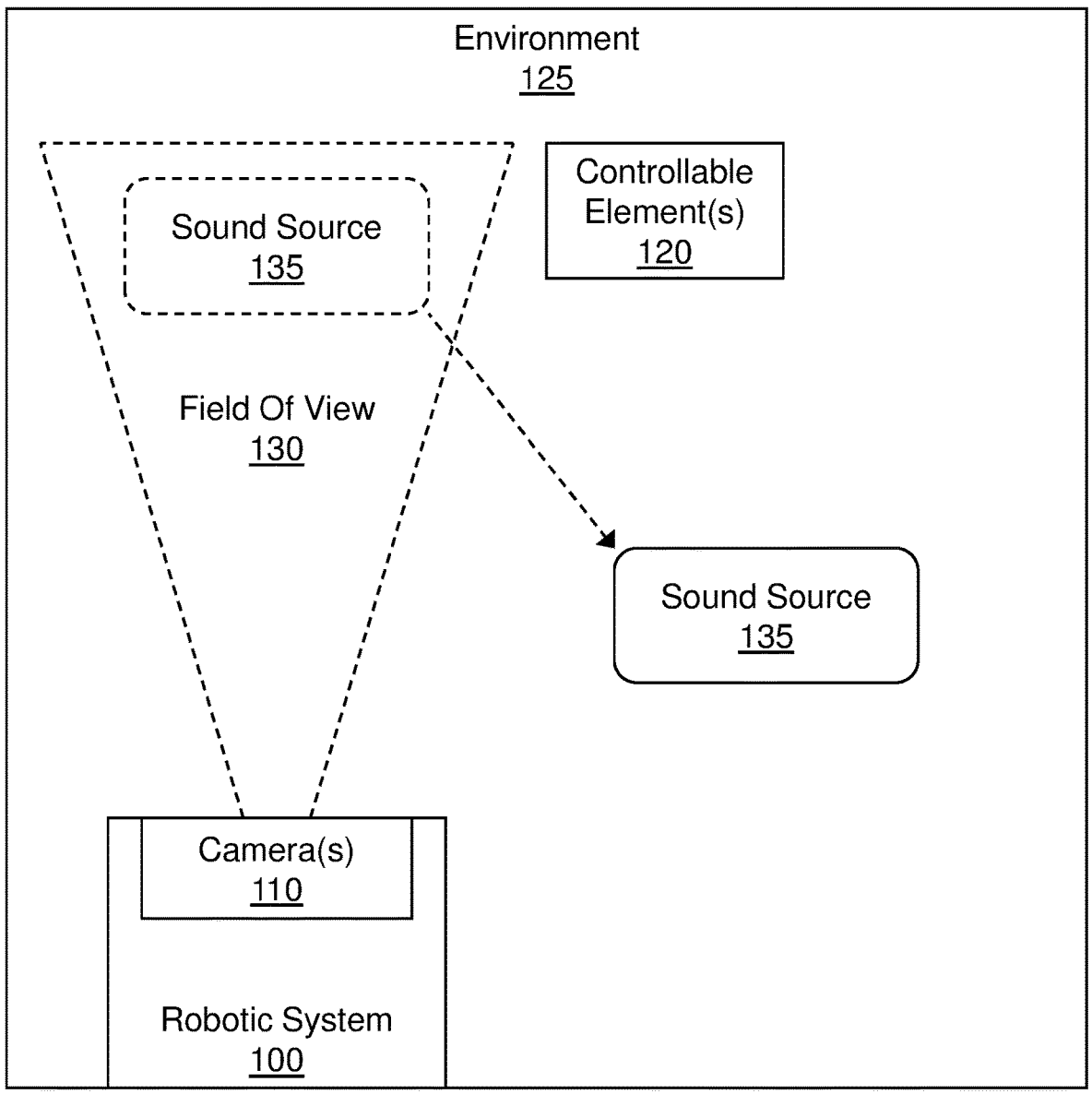
FIG. 6 shows a schematic block diagram of another example of an environment comprising a robotic system in accordance with embodiments.

Referring to FIG. 6, there is shown schematically an example of another environment 125 comprising the robotic system 100. In this example, the sound source 135 is initially within the field of view 130 of the camera 110, in the visible part of the environment 125, and moves to be outside the field of view 130 of the camera 110 and the visible part of the environment 125, as indicated by the broken lines in FIG. 6.

Figure 7:
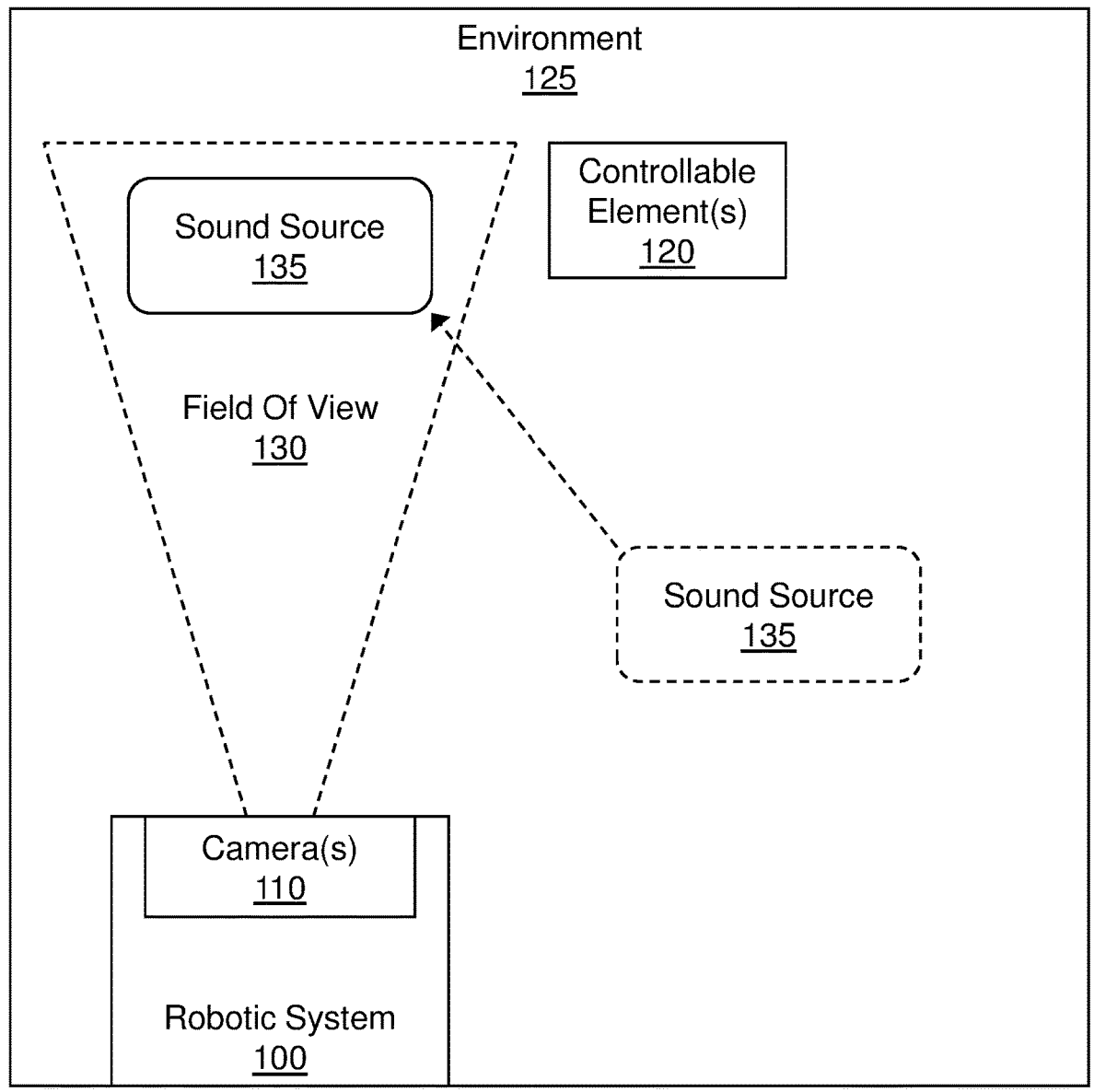
FIG. 7 shows a schematic block diagram of another example of an environment comprising a robotic system in accordance with embodiments.

Referring to FIG. 7, there is shown schematically an example of another environment 125 comprising the robotic system 100. In this example, the sound source 135 is initially outside the field of view 130 of the camera 110 and the visible part of the environment 125, and moves to be within the field of view 130 of the camera 110 in the visible part of the environment 125, as indicated by the broken lines in FIG. 7.

Referring to FIGS. 6 and 7, the robotic system 100 may initially recognise a user or another object. The object may then no longer be visible to the camera 110. For example, the object may be outside the (limited) field of view of the camera 110, may be occluded etc. The robotic system 100 may be able to keep tracking the object (for example user) based on the sound the user makes during this period. The sound may be natural sound including, for example, speech. The robotic system 100 may be able to infer when the object (for example user) will appear or has appeared again in the camera view and successfully performs data association on this basis. In some examples, the robotic system 100 sees the object via the camera 110 and starts tracking the object. When the object leaves the camera frustum, the robotic system 100 is still able to keep tracking the object since robotic system 100 is able to hear the object. For example, the camera 110 and microphone 115 (at least) may be placed in the kitchen and may be unable to see users in a living room. However, the microphone 115 can hear the users them. For example, the microphone 115 may be able to audibly detect the users walking, speaking or making some other noise. The robotic system 100 may be able to forecast when and where the users will appear in the image space (i.e. the visible part of the environment 125). This scenario can also be reversed. For example, the robotic system 100 may first hear users before seeing them. Accuracy in this scenario can be improved with a spatial model (for example, a map) of the environment 125 as described above. Examples of such maps include, but are not limited to 3D maps, floorplans, acoustic maps etc.

As such, the robotic system 100 may identify a first location of the sound source 135 outside of the visible part of the environment 125. The robotic system 100 may identify, based on at least the audio data component of the audiovisual data, a second location of the sound source 135. The robotic system 100 may track movement of the sound source 135 based on at least the first and second locations of the sound source.

In some examples, the second location of the sound source 135 is within the visible part of the environment 125. In some examples, the second location is identified before the first location is identified. In some such examples, the robotic system 100 can track movement of the sound source 135 from outside the visible part of the environment 125 to within the visible part of the environment 125. In some examples, the first location is identified before the second location is identified. In some such examples, the robotic system 100 can track movement of the sound source 135 from within the visible part of the environment 125 to outside the visible part of the environment 125. As explained above, some examples comprise track movement of the sound source 135 from within the visible part of the environment 125 to outside the visible part of the environment 125 and then from outside the visible part of the environment 125 to within the visible part of the environment 125 and/or vice versa.

As such, relationship mapping may be performed between detected and/or recognized users and/or other types of object, and their activity in the audiovisual scene. The user's 2D or 3D pose can be automatically inferred, and this can be maintained across longer time spans even if the audiovisual data is only partially observable. This may be the case, for example, if the user is not visible within the camera frustum but the microphone array 115 can recognise and localise the sound the user makes by walking, speaking and/or performing some other action).

Various measures (for example robotic systems, methods of controlling robotic systems and computer programs arranged to control robotic systems) are provided in relation to the control of a robotic system. Audiovisual data representing an environment in which at least part of the robotic system is located is received via at least one camera and at least one microphone. The audiovisual data comprises a visual data component representing a visible part of the environment and an audio data component representing an audible part of the environment. A location of a sound source that emits sound that is represented in the audio data component of the audiovisual data is identified based on the audio data component of the audiovisual data. The sound source is outside the visible part of the environment and is not represented in the visual data component of the audiovisual data. Operation of a controllable element located in the environment is controlled based on the identified location of the sound source. As such, improved accuracy of a computer vision algorithm may be provided through the use of audiovisual detection. This is effective in the context of home assistive applications, but is also effective in other contexts. A person, user and/or another type of object may, for example, be tracked more effectively than if only visual data were used, particularly where the object is not visible within the camera frustum. The measures provided herein do not rely on, or even require, the object to be visible within the camera frustum. The robotic system may still be able to track an object, such as a user, that rotates around a vertical axis (out-of-plane rotation) which results in a significant change in visual appearance. For example, a user's face may initially be visible to the robotic system, the user may turn such that the back of their head is visible to the robotic system but their face is not, and the robotic system may still be able to track the user based on noises they make when only the back of their head can be seen. Since people generally emit sound when they move (walking, speaking or general noise), the robotic system is able to use these audio cues to keep successfully tracking a person. This can be especially effective where the robotic system is not self-propelling and, as such, where the robotic system may not be able to move towards the sound source to try to detect the sound source visually. However, as indicated here, the robotic system can still function when the sound source does not emit sound but is visible to the robotic system.

In some examples, the at least one microphone comprises an array of microphones comprising at least first and second microphones, wherein the sound emitted by the sound source is received at both the first and second microphones in the microphone array, and wherein the location of the sound source is identified based at least in part on differences in phase and/or intensity of the sound as received at the first and second microphones in the microphone array. As such, measures may be provided to locate the sound source based on information relating to the sound source that is available to the robotic system.

In some examples, the identifying of the location of the sound source comprises determining a direction and/or a distance of the sound source with respect to the at least one microphone. This can facilitate locating of the sound source where limited information to locate the sound source is available.

In some examples, the identifying of the location of the sound source comprises using a spatial model of the environment. This can facilitate reliable locating of the sound source, using the spatial model.

In some examples, the spatial model of the environment represents at least part of the audible part of the environment, wherein the at least part of the audible part of the environment is not also part of the visible part of the environment. This can facilitate reliable locating of the sound source, where the sound source is not in the visible part of the environment.

Some examples comprise generating the spatial model using data received via the at least one camera and/or via the at least one microphone. This can enable the robotic system to have an accurate representation of the environment.

Some examples comprise identifying an activity type of the audible activity. This can enhance control of the controllable element.

In some examples, the identifying of the location of the sound source is based at least in part on the identified activity type of the audible activity. This can facilitate accurate locating of the sound source, whether or not the robotic system comprises an array of microphones.

In some examples, the controllable element is comprised in a self-propelling device and wherein the controlling of the operation of the controllable element comprises causing the self-propelling device to avoid the location of the sound source. Depending on the nature of the emitted sound, avoiding the location of the sound source may preserve the integrity of the controllable element, for example where the sound corresponds to activity that could damage the controllable element, disturb a user etc.

In some examples, the controllable element is comprised in a self-propelling device and wherein the controlling of the operation of the controllable element comprises causing the self-propelling device to move towards the location of the sound source. In some examples, the controllable element is comprised in a self-propelling device and wherein the controlling of the operation of the controllable element comprises causing the self-propelling device to avoid the location of the sound source. Depending on the nature of the emitted sound, moving to the location of the sound source may be assistive, for example, where an out-of-sight user is in difficulty and the self-propelling device can be dispatched to assist the user.

Some examples comprise determining a location of at least part of the robotic system using the location of the sound source as a reference location. As such, the robotic system can self-locate using the sound source. This may be effective where the robotic system does not comprise other self-locating functionality, to enhance existing self-locating functionality etc.

Some examples comprise, in response to determining that the audible activity is outside an initial field of view of the at least one camera, causing the at least one camera to be configured to have a further, different field of view. As such, the robotic system may increase the likelihood of being able to detect the sound source visually by increasing the field of view.

In some examples, the controlling the operation of the controllable element comprises transmitting a control signal to the controllable element. As such, a controllable element in a distributed arrangement may still be controlled by the robotic system.

Some examples comprise analysing the visual data component of the audiovisual data for visible activity corresponding to the audible activity. As such, the robotic system may use both audible and visual detection on an ongoing basis and use the most relevant one or more modalities depending on the particular scenario.

In some examples, the audible activity is caused by activity of a person located in the environment. As such, the robotic system can react to human activity.

Some examples comprise identifying the person. As such, the robotic system can be controlled based on the identity of a person located in the environment. This can facilitate, for example, personalised control of the controllable element.

In some examples, the at least one camera, the at least one microphone and the at least one controllable element are all comprised in the same electronic device as each other. This can provide a compact, relatively low-complexity arrangement.

In some examples, the at least one camera, the at least one microphone and the at least one controllable element are distributed across at least two different electronic devices. This can provide a more flexible arrangement, which can potentially cover a larger environment than a more unified, compact arrangement.

In some examples, the at least one camera, the at least one microphone and/or the at least one controllable element is comprised in a vacuum cleaner, a lawnmower, a smart home controller, a robotic pet, an appliance, a vehicle, and/or a robotic assistive device. The functionality described herein can be applied in various different contexts where non-visible information may be useful in controlling operation of the controllable element.

In some examples, the controllable element is configured to control at least one environmental parameter of the environment. As such, the robotic system can control the surrounding environment via the controllable element.

In some examples, the identified location of the sound source is a first location of the sound source. A second location of the sound source may be identified based on at least the audio data component of the audiovisual data. Movement of the sound source may be tracked based on at least the first and second locations of the sound source. As such, the robotic system may be able to track objects (such as users) that are not fully visible.

In some examples, the second location of the sound source is within the visible part of the environment. As such, the robotic system may be able to track objects (such as users) that switch between being visible and not being fully visible.

Some examples comprise identifying, based on the audiovisual data, at least one attribute of further activity, wherein the further activity involves emission of sound by a further sound source that is within the visible part of the environment and that is represented in the visual data component of the audiovisual data. As such, the robotic system can still be compatible with sound sources located within the visible part of the environment.

Various measures (for example robotic systems, methods of controlling robotic systems and computer programs arranged to control robotic systems) are provided in which a robotic system comprise a controller configured to identify a location of out-of-view audible activity using audio data received via an array of microphones and to transmit a control signal to control operation of a controllable element in dependence on the identified location of the out-of-view audible activity.

Various measures (for example robotic systems, methods of controlling robotic systems and computer programs arranged to control robotic systems) are provided in which a robotic system is configured to use a microphone array to identify a location of activity that is audible by and not visible to the robotic system.

The above embodiments are to be understood as illustrative examples. Further embodiments are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling a robotic system, the method comprising:
   receiving, via at least one camera and at least one microphone, audiovisual data representing an environment in which at least part of the robotic system is located, the audiovisual data comprising a visual data component representing a visible part of the environment and an audio data component representing an audible part of the environment;
   identifying, based on the audio data component of the audiovisual data, a first location of a sound source that emits sound that is represented in the audio data component of the audiovisual data, wherein the sound source is outside the visible part of the environment and is not represented in the visual data component of the audiovisual data;
   controlling operation of a controllable element located in the environment based on the first location of the sound source;
   identifying, based on at least the audio data component of the audiovisual data, a second location of the sound source; and
   tracking movement of the sound source based on at least the first and second locations of the sound source.

2. A method according to claim 1, wherein the at least one microphone comprises an array of microphones comprising at least first and second microphones, wherein the sound emitted by the sound source is received at both the first and second microphones in the microphone array, and wherein the first location of the sound source is identified based at least in part on differences in phase and/or intensity of the sound as received at the first and second microphones in the microphone array.

3. A method according to claim 1, wherein the identifying of the first location of the sound source comprises determining a direction and/or a distance of the sound source with respect to the at least one microphone.

4. A method according to claim 1, wherein the identifying of the first location of the sound source comprises using a spatial model of the environment.

5. A method according to claim 4, wherein the spatial model of the environment represents at least part of the audible part of the environment, wherein the at least part of the audible part of the environment is not also part of the visible part of the environment.

6. A method according to claim 4, comprising generating the spatial model using data received via the at least one camera and/or via the at least one microphone.

7. A method according to claim 1, comprising identifying an activity type of the audible activity.

8. A method according to claim 7, wherein the identifying of the first location of the sound source is based at least in part on the identified activity type of the audible activity.

9. A method according to claim 1, wherein the controllable element is comprised in a self-propelling device and wherein the controlling of the operation of the controllable element comprises causing the self-propelling device to avoid the first location of the sound source.

10. A method according to claim 1, wherein the controllable element is comprised in a self-propelling device and wherein the controlling of the operation of the controllable element comprises causing the self-propelling device to move towards the first location of the sound source.

11. A method according to claim 1, comprising determining a location of at least part of the robotic system using the first location of the sound source as a reference location.

12. A method according to claim 1, comprising, in response to determining that the audible activity is outside an initial field of view of the at least one camera, causing the at least one camera to be configured to have a further, different field of view.

13. A method according to claim 1, wherein controlling the operation of the controllable element comprises transmitting a control signal to the controllable element.

14. A method according to claim 1, comprising analysing the visual data component of the audiovisual data for visible activity corresponding to the audible activity.

15. A method according to claim 1, wherein the audible activity is caused by activity of a person located in the environment.

16. A method according to claim 15, comprising identifying the person.

17. A method according to claim 1, wherein the at least one camera, the at least one microphone and the at least one controllable element are all comprised in the same electronic device as each other.

18. A method according to claim 1, wherein the at least one camera, the at least one microphone and the at least one controllable element are distributed across at least two different electronic devices.

19. A method according to claim 1, wherein the at least one camera, the at least one microphone and/or the at least one controllable element is comprised in:
    a vacuum cleaner;
    a lawnmower;
    a smart home controller;
    a robotic pet;
    an appliance;
    a vehicle; and/or
    a robotic assistive device.

20. A method according to claim 1, wherein the controllable element is configured to control at least one environmental parameter of the environment.

21. A method according to claim 1, wherein the second location of the sound source is within the visible part of the environment.

22. A method according to claim 1, comprising identifying, based on the audiovisual data, at least one attribute of further activity, wherein the further activity involves emission of sound by a further sound source that is within the visible part of the environment and that is represented in the visual data component of the audiovisual data.

23. A robotic system comprising a controller configured to perform a method according to claim 1.

24. A computer program arranged to perform a method according to claim 1.

* * * * *